US008767952B2

(12) United States Patent
Diab et al.

(10) Patent No.: US 8,767,952 B2
(45) Date of Patent: Jul. 1, 2014

(54) METHOD AND SYSTEM FOR UTILIZING A SINGLE CONNECTION FOR EFFICIENT DELIVERY OF POWER AND MULTIMEDIA INFORMATION

(75) Inventors: Wael William Diab, San Francisco, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 1015 days.

(21) Appl. No.: 12/243,539

(22) Filed: Oct. 1, 2008

(65) Prior Publication Data

US 2009/0158377 A1    Jun. 18, 2009

Related U.S. Application Data

(60) Provisional application No. 61/014,332, filed on Dec. 17, 2007.

(51) Int. Cl.
*H04L 12/56* (2006.01)
*H04M 9/00* (2006.01)

(52) U.S. Cl.
USPC .................................. 379/413; 370/395.64

(58) Field of Classification Search
USPC ............ 370/395.64, 463, 467; 709/231, 232; 379/413
See application file for complete search history.

(56) References Cited

U.S. PATENT DOCUMENTS

| 6,856,597 | B1 | 2/2005 | Scott |
| 7,706,392 | B2 | 4/2010 | Ghoshal et al. |
| 7,903,809 | B2* | 3/2011 | Karam .......................... 379/413 |
| 2002/0080886 | A1* | 6/2002 | Ptasinski et al. .............. 375/295 |
| 2002/0099756 | A1* | 7/2002 | Catthoor et al. .............. 709/102 |
| 2004/0088590 | A1 | 5/2004 | Lee et al. |
| 2005/0210101 | A1* | 9/2005 | Janik ............................. 709/203 |
| 2006/0034295 | A1 | 2/2006 | Cherukuri et al. |
| 2006/0050825 | A1* | 3/2006 | Page ............................. 375/356 |

(Continued)

FOREIGN PATENT DOCUMENTS

| EP | 1694023 A1 | 8/2006 |
| WO | WO 2007/058871 | 5/2007 |
| WO | WO2007058871 | 5/2007 |

OTHER PUBLICATIONS

Teener, Michael J. "AV Bridging and Ethernet AV™." internet citation, Mar. 2, 2007: 3-8. ,http://www.ieee802.org/1/files/public/docs2007/as-mjt-AVB-Combo-For-ITU-0307.pdf.*
Garner, Geoffrey M., et al. "IEEE 802.1 AVB and Its Application in Carrier-Grade Ethernet [Standards Topics]." Communications Magazine, IEEE 45.12 (2007): 126-134.*
European Search Report corresponding to European Patent Application Serial No. 08021207.9-2416, dated Apr. 15, 2009.
Daoud et al., "Fault-Tolerant Ethernet-Based Vehicle On-Board Networks." IECON 2006—32nd Annual Conference on IEEE Industrial Electronics, Nov. 1, 2006.

(Continued)

*Primary Examiner* — Dang Ton
*Assistant Examiner* — Ryan Kavleski
(74) *Attorney, Agent, or Firm* — Brinks Gilson & Lione

(57) ABSTRACT

Aspects of a method and system for utilizing a single connection for efficient delivery of power and multimedia information are provided. In this regard, power supplied and/or received over a network link may be controlled based on multimedia content communicated over the network link. The multimedia content may be converted to and/or from Ethernet frames for communication over the network link utilizing audio video bridging. The multimedia content may be raw video or may be formatted according to, for example, HDMI or DisplayPort specifications. The power supplied may be controlled by selecting one of a plurality of power classes. The selection of power class may be based on resolution of the multimedia content, whether the multimedia comprises audio and/or video, and/or based on latency targets.

20 Claims, 5 Drawing Sheets

(56) References Cited

U.S. PATENT DOCUMENTS

| | | | |
|---|---|---|---|
| 2006/0077310 A1* | 4/2006 | Wang et al. | 348/838 |
| 2007/0041387 A1* | 2/2007 | Ghoshal et al. | 370/395.52 |
| 2007/0061846 A1 | 3/2007 | Gollwitzer | |
| 2007/0106913 A1* | 5/2007 | Lewis et al. | 713/300 |
| 2007/0110360 A1 | 5/2007 | Stanford | |
| 2007/0206641 A1 | 9/2007 | Egan | |
| 2007/0207741 A1 | 9/2007 | Jones | |
| 2007/0219732 A1 | 9/2007 | Creus et al. | |
| 2007/0280239 A1 | 12/2007 | Lund | |
| 2007/0288772 A1* | 12/2007 | Li | 713/300 |
| 2008/0005600 A1* | 1/2008 | Diab et al. | 713/300 |
| 2008/0030624 A1* | 2/2008 | Chang | 348/730 |
| 2008/0089512 A1* | 4/2008 | Hussain et al. | 379/406.01 |
| 2008/0120675 A1* | 5/2008 | Morad et al. | 725/120 |
| 2008/0201756 A1* | 8/2008 | Shakiba et al. | 725/119 |
| 2008/0288702 A1* | 11/2008 | Diab et al. | 710/304 |
| 2009/0017860 A1* | 1/2009 | Cole | 455/522 |
| 2009/0152943 A1* | 6/2009 | Diab et al. | 307/10.1 |
| 2011/0051741 A1* | 3/2011 | Diab et al. | 370/401 |
| 2011/0126032 A1* | 5/2011 | Khan et al. | 713/310 |

OTHER PUBLICATIONS

Gupta et al., "Dynamic Ethernet Link Shutdown for Energy Conservation on Ethernet Links." IEEE, Jun. 24, 2007. XP002524616.

Mehrnoush et al., "A Novel Network Architecture for In-Vehicle Audio and Video Communication." Second IEEE/IFIP International Workshop on Broadband Convergence Networks, May 1, 2007.

Daoud et al., "Ethernet-Based Car Control Network." IEEE Canadian Conference on Electrical and Computer Engineering, May 1, 2006.

Garner et al., "IEEE 802.1 AVB and Its Application in Carrier-Grade Ethernet [Standards Topics]." IEEE Communications Magazine, vol. 45, No. 12, Dec. 1, 2007.

Kang et al., "Time Synchronization and Resource Reservation for Time-Sensitive Applications in Bridged Local Area Networks." IEEE Sixth International Conference on Advanced Language Processing and Web Information Technology, Aug. 22, 2007.

Wael Diab, "Energy Efficient Ethernet and 802.1." Nov. 2007. XP002524617.

* cited by examiner

METHOD AND SYSTEM FOR UTILIZING A SINGLE CONNECTION FOR EFFICIENT DELIVERY OF POWER AND MULTIMEDIA INFORMATION

CROSS-REFERENCE TO RELATED APPLICATIONS/INCORPORATION BY REFERENCE

This patent application makes reference to, claims priority to and claims benefit from U.S. Provisional Patent Application Ser. No. 61/014,332 filed on Dec. 17, 2007.

The above stated provisional application is hereby incorporated herein by reference in its entirety.

FIELD OF THE INVENTION

Certain embodiments of the invention relate to signal processing. More specifically, certain embodiments of the invention relate to a method and system for utilizing a single connection for efficient delivery of power and multimedia information.

BACKGROUND OF THE INVENTION

The generation and rendering of high end graphics often involves the movement of large quantities of data. Frequently the data is stored in a server, from which it may be accessed by users at computer workstations via a network. Once the data is received at the computer workstation, the graphics may be displayed on an attached video monitor. In many cases the video monitor is physically separate and has been conventionally attached to the computer workstation via an analog interface, such as a video graphics array (VGA) interface, or a digital interface such as a digital visual interface (DVI). In a typical configuration, an interface in the computer workstation is connected to a compatible interface in the video monitor via an interstitial connector, such as a cable.

The ever increasing amount of multimedia content, and in particular, high quality multimedia content is presenting a number of challenges to designers and administrators of computing platforms and network alike. For example, bandwidth, hardware, and the isochronous nature of multimedia file transfers are all factors limiting the quality and availability of the multimedia content. In this regard a number of standards have been developed for transporting high quality multimedia data for presentation. For example, the digital video interface (DVI) and High Definition Multimedia Interface (HDMI) represent two of the most widely adopted and utilized display interfaces. However, DVI and HDMI each have a number of drawbacks which Video electronics Standards Association (VESA) has attempted to address with the newly emerging DisplayPort (DP) standard. In this regard, DP may offer, for example, increased bandwidth and more advanced copy protection as compared to DVI or HDMI.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a single connection for efficient delivery of power and multimedia information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a single connection for efficient delivery of power and multimedia information. In this regard, power supplied and/or received over a network link may be controlled based on multimedia content communicated over the network link, where the multimedia content may be converted to and/or from Ethernet frames for communication over the network link utilizing audio video bridging. The multimedia content may be formatted as raw audio and/or video data or may be formatted and/or packetized according to HDMI, DisplayPort, or USB specifications, for example. The power may be controlled by selecting one of a plurality of power classes. The selection of power class may be based on resolution of the multimedia content, whether the multimedia comprises audio and/or video, and/or based on latency targets. In this regard, power needs of devices coupled to a network link may be proportional, or track, a data rate on the link. Accordingly, reducing a data rate on the connection may enable reducing the power supplied over the connection. The power may also be delivered in accordance with USB standards. A data rate on the network link may be controlled via inter-frame gap adjustment, adjusting a signal constellation utilized for communication on the link, a symbol rate utilized on the link, and/or a number of PAM levels utilized on the link.

Figure 1:
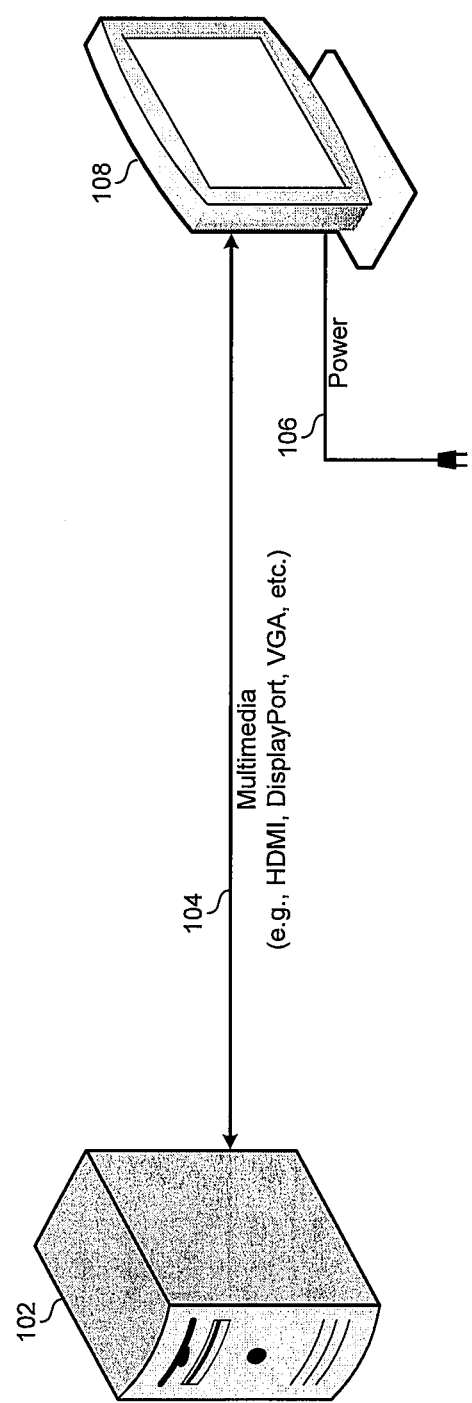
FIG. 1 is a diagram of a conventional multimedia system where data and power are delivered separately, in connection with an embodiment of the invention.

FIG. 1 is a diagram of a conventional multimedia system where data and power are delivered separately, in connection with an embodiment of the invention. Referring to FIG. 1 there is shown a multimedia server 102, a multimedia connection 104, a power connection 106, and a multimedia client 108.

The multimedia server 102 may comprise suitable logic, circuitry, and/or code that may enable delivery of multimedia over the multimedia connection 104. The multimedia connection 104 may comprise a point-to-point connection, such as HDMI or DisplayPort, for conveying multimedia. The power connection 106 may, for example, couple the multimedia client 108 to a power outlet. For example, the cable may supply AC power and/or may perform AC to DC conversion and supply DC power for distribution to the client 108. The multimedia client 108 may comprise suitable logic, circuitry, and/or code for receiving data via the multimedia connection 104 and receiving power via the connection 106.

In operation, multimedia data may be communicated between the server 102 and the client 108 via the multimedia connection. In this regard, the multimedia connection may be proprietary, and thus costly. Additionally, the multimedia connection may not be suited for transmission over a network or long distances. Furthermore, power may be supplied to the client 108 by the separate power connection 106. In this regard, the client requires two cables for operation. Thus, there are several drawbacks associated with the conventional method and system for multimedia and power delivery depicted in FIG. 1.

Figure 2A:
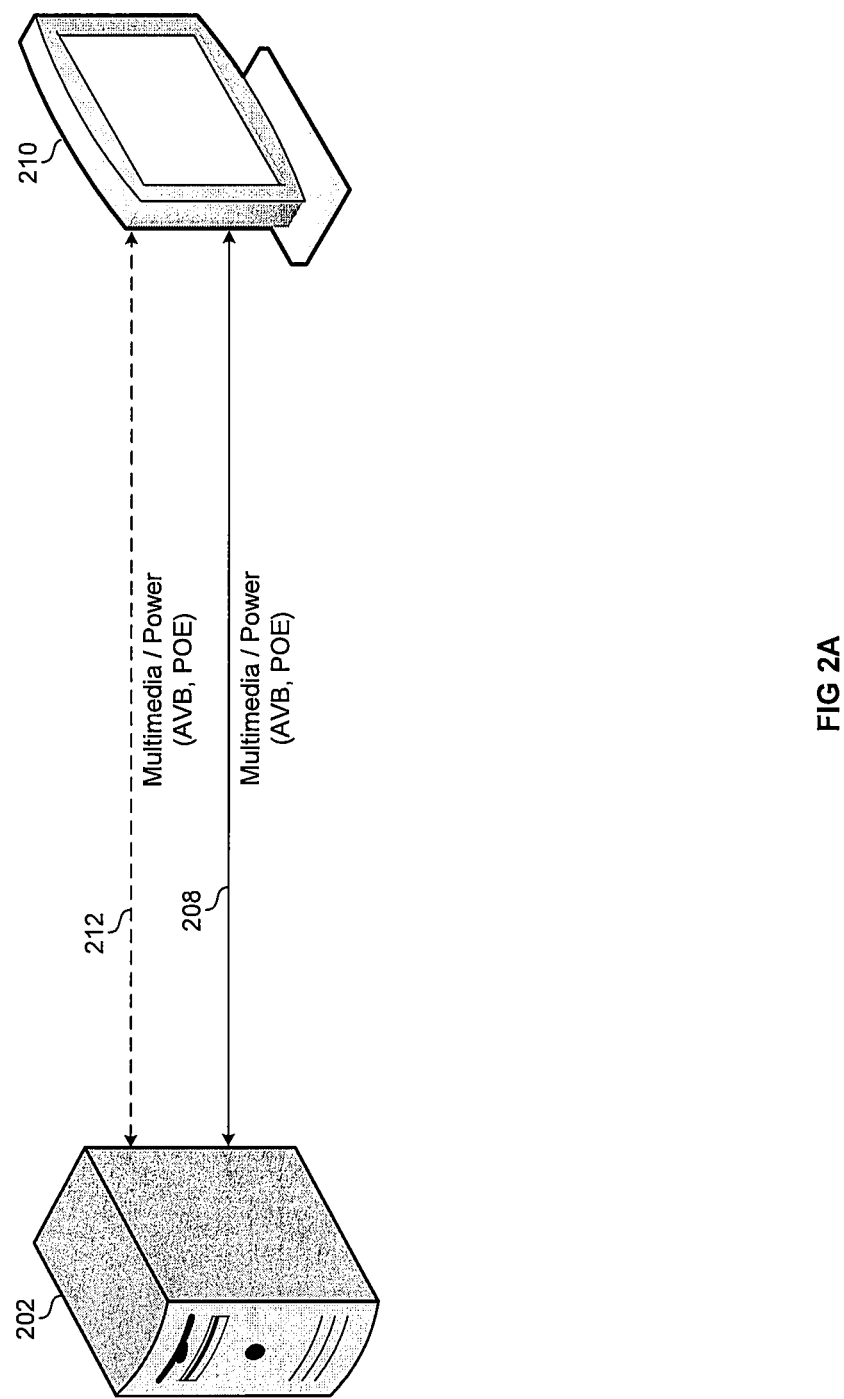
FIG. 2A is a diagram illustrating a single connection between a server and a client for delivery of power and multimedia information, in accordance with an embodiment of the invention.

FIG. 2A is a diagram illustrating a single connection between a server and a client for delivery of power and multimedia information, in accordance with an embodiment of the invention. Referring to FIG. 1A, there is shown a multimedia server 202, an Ethernet cable 208, and a multimedia client 210.

The multimedia server 202 may comprise suitable logic, circuitry, and/or code that may enable delivery of multimedia data and power to a client device. In this regard, the computing device may be enabled to communicate in accordance with Ethernet standards and may additionally utilize Audio Video Bridging and/or extensions thereto (collectively referred to herein as AVB or Audio Video Bridging) for the delivery of multimedia and/or time sensitive data. Additionally, the multimedia server 202 may comprise suitable logic, circuitry, and/or code that may enable the server 202 to function as power supplying equipment (PSE).

In an exemplary embodiment of the invention, the multimedia server 202 may be enabled to communicate in compliance with universal serial bus (USB) standards. Moreover, the multimedia server 202 may be enabled to tunnel USB over Ethernet in a manner such as is described in U.S. patent application Ser. No. 12/056,445 filed on Mar. 27, 2008, which is hereby incorporated herein by reference in its entirety. Thus, USB packets comprising multimedia content may be encapsulated into one or more Ethernet frames and conveyed via the cable 208 alongside power. In this regard, the power delivered over the cable 208, and possibly the redundant cable 212, may adhere to USB standards.

The Ethernet cable 208 may comprise one or more shielded or unshielded twisted pairs. Power and data may be delivered via one or more of the twisted pairs. For example, the cable 208 may comprise Cat-3, Cat-5, or Cat-5e cabling and power and data may be delivered via 1, 2, 3, or 4, pairs. The cable 110 may be a physical medium suitable for conveying data and power. In an exemplary embodiment of the invention, the cable 208 may be a conventional Cat-5 cable comprising four twisted pairs with an 8 position 8 conductor (8P8C) plug (often referred to as RJ-45) on either end. In other embodiments of the invention, the cable 208 may comprise physical media which may not be utilized in a conventional Ethernet network but may be suitable and/or desirable for a particular application. In this regard, Ethernet cables and/or the connectors with which they are terminated and/or to which they are coupled, may be modified, enhanced, or otherwise different from their conventional counterparts utilized in conventional Ethernet networks. For example, shielded and/or unshielded cable may be utilized, cables may be terminated in ganged connectors, and cables may comprise any number of twisted pairs. In this regard, the link may comprise a cable with fewer than 4 twisted pairs to reduce cost and/or weight. In this regard, the PSE 101 and the PD 103 may be operable to supply and/or receive power via an Ethernet link comprising a single physical channel as disclosed in U.S. Provisional Patent Application No. 61/082,541, filed on Jul. 22, 2008 which is hereby incorporated herein by reference in its entirety. Additionally, in instances that a cable comprises more channels (e.g., twisted pairs) than are necessary to deliver data and power, additional channels may be utilized for redundancy to improve reliability of data and/or power.

In various embodiments of the invention, one or more redundant network links, such as the link 212 depicted as a dashed line in FIG. 2A, may be present. In various embodiments of the invention, loops in the network may be normally blocked as a result of a spanning tree algorithm but may be utilized in the event of a network failure. Alternatively, redundant paths may be utilized to increase data throughput and/or power delivered between two or more nodes in a network.

The multimedia client 210 may comprise suitable logic, circuitry, and/or code that may enable receiving multimedia data encapsulated in Ethernet frames, extracting the multimedia from the Ethernet frames, and presenting the multimedia to a user via a display and/or speakers. In this regard, the multimedia client 210 may be enabled to render, format, decompress, or otherwise process the multimedia for presentation to a user. Additionally, the multimedia client 210 may be a powered device (PD) and may thus comprise suitable logic, circuitry, and/or code that may enable receiving power via the Ethernet cable 208.

In an exemplary embodiment of the invention, the multimedia client 210 may be enabled to communicate in compliance with universal serial bus (USB) standards. Moreover, the multimedia client 202 may be enabled to receive USB over Ethernet in a manner such as is described in U.S. patent application Ser. No. 12/056,445 filed on Mar. 27, 2008, which is hereby incorporated herein by reference in its entirety. Thus, USB packets comprising multimedia content may be extracted from one or more Ethernet frames and conveyed to a USB subsystem of the multimedia client 210. Additionally, power received via the cable 208, and possibly the redundant cable 212, may be conveyed to a USB subsystem of the client 210.

In operation, the multimedia server 202 may encapsulate multimedia data in one or more Ethernet frames. The format of the Ethernet frames may be specified in applicable standards documents, such as IEEE 802 standards. The Ethernet frames may contain, for example, a destination address field which may indicate that the Ethernet frames are to be delivered to the computing device 122. The Ethernet frames may comprise, for example, an Ethertype field which may indicate that the Ethernet frame is being utilized to encapsulate multimedia content of a particular format. Formats may include, for example, raw audio/video, HDMI, and DisplayPort. The multimedia server 202 may transmit the Ethernet frames onto the cable 208 for delivery to the multimedia client 210. Accordingly, the multimedia client 210 may receive the Ethernet frames via the cable 208, extract the multimedia content, and render and/or present the content via a display and/or speakers. Additionally, the multimedia server 202 may apply a DC voltage to one or more of the twisted pairs of the cable 208 to power the multimedia client 210. In this manner, data and power may be received via the Ethernet cable 208. Thus, the single Ethernet cable 208 may replace the multimedia cable 104 and the power cable 106 described with respect to FIG. 1.

In various embodiments of the invention, the multimedia server 102 may generate instructions for rendering the multimedia on the multimedia client 108 instead of requiring that this task be performed within the multimedia client 108. Thus, various embodiments of the invention may enable the multimedia client 108 to be a "thin client" device, which may not require high performance hardware and/or software capabilities to enable the generation of multimedia content for high performance video and/or graphics applications. This in turn may enable the rendering of high performance video and/or graphics on multimedia servers 102 which are attached to low cost multimedia clients 108.

Figure 2B:
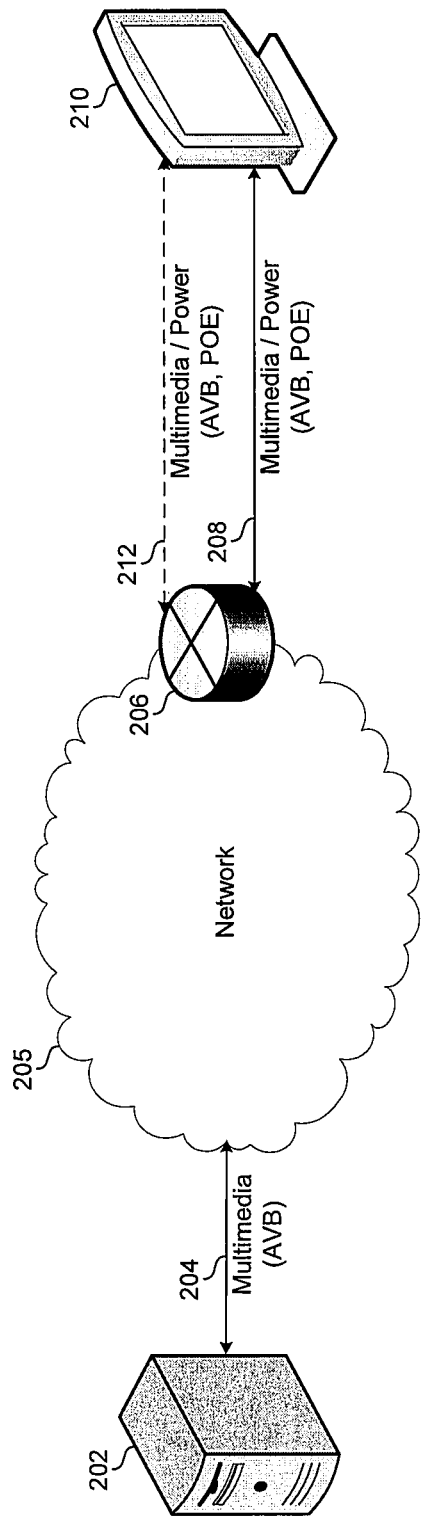
FIG. 2B is a diagram illustrating a single connection between a network node and a client for delivery of power and multimedia, in accordance with an embodiment of the invention.

FIG. 2B is a diagram illustrating a single connection between a network node and a client for delivery of power and multimedia, in accordance with an embodiment of the invention. Referring to FIG. 2B, there is shown a multimedia server 202, network cable 204, a network 205, network cable 208, and a multimedia client 210.

The multimedia server 202, the cable 208, and the multimedia client 210 may be as described with respect to FIG. 2A. The network cable 204 may be similar to or the same as the network cable 208 described with respect to FIG. 2A.

The network 205 may comprise one or more network nodes, comprising switches, routers, and/or servers, for example. In this regard, the network 205 may comprise a node 206 which may be communicatively coupled to the multimedia client 210. The node 206 may comprise suitable logic, circuitry, and/or code for receiving and forwarding multimedia traffic. Additionally, the node 206 may comprise suitable logic, circuitry, and/or code that may enable the node 206 to function as PSE.

In an exemplary operation, the multimedia server 202 may encapsulate multimedia data in one or more Ethernet frames. The format of the Ethernet frames may be specified in applicable standards documents, such as IEEE 802 standards. The Ethernet frames may contain a destination address field, for example, which may indicate that the Ethernet frames are to be delivered to the multimedia client 210. The Ethernet frames may comprise an Ethertype field, for example, which may indicate that the Ethernet frame is being utilized to encapsulate multimedia content of a particular format. Formats may include, for example, raw audio/video, HDMI, and DisplayPort. The Ethernet frames may also comprise a traffic class identifier, which may enable the network 205 to provide AVB services. These services may comprise prioritized transport of the Ethernet frames across the network 205 to enable the time duration for transport across the network 205 to meet latency targets associated with the specified traffic class.

In various embodiments of the invention, point-to-point oriented traffic, which may not be network aware or contain a means of network identification may be encapsulated in Ethernet frames at the multimedia server 202, and transported across the network 205. The point-to-point oriented traffic may comprise multimedia content such as Display Port micro-packets, or even raw data generated by an application program. The encapsulated traffic may be de-encapsulated at the multimedia client 210. Thus, in various embodiments of the invention, from the perspective of the application(s) which enable the generation of the point-to-point oriented traffic, the multimedia server 202 may transport the point-to-point oriented traffic to the destination multimedia device 210 across the network 205 as though the multimedia client 210 were directly attached to the multimedia server 202 via a multimedia interface, such as an HDMI or DisplayPort interface.

Figure 3:
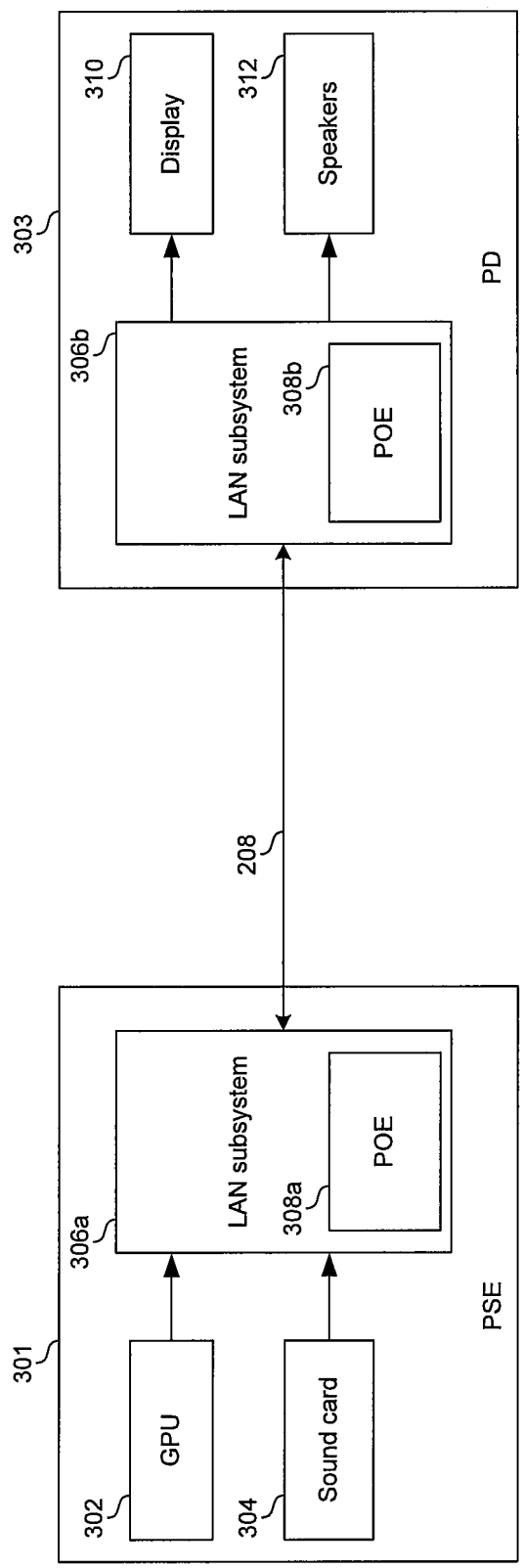
FIG. 3 is a diagram illustrating delivery of multimedia data and power over an Ethernet connection, in accordance with an embodiment of the invention.

FIG. 3 is a diagram illustrating delivery of multimedia data and power over an Ethernet connection, in accordance with an embodiment of the invention. Referring to FIG. 3 there is shown power supplying equipment (PSE) 301, a network cable 208, and powered device (PD) 303.

The PSE 301 may comprise a graphics processing unit (GPU) 302, a sound card 304, and a local area networking (LAN) subsystem 306a. The PSE 301 may be enabled to transmit multimedia data over the network cable 208 and to generate power supplied to the PD 303 over the cable 208. In this regard, the PSE 301 may be similar to or the same as the server 202 and/or the network node 206 described with respect to FIG. 2B.

The GPU 302 may comprise suitable logic, circuitry, and/or code that may enable generating graphics and/or video data. In this regard, resolution, encoding, format, compression, data rates, and/or other characteristics of video and/or graphics out of the GPU 302 may vary without deviating from the scope of the invention. The sound card 304 may comprise suitable logic, circuitry, and/or code that may enable generating audio data. In this regard, resolution, encoding, format, compression, data rates, and/or other characteristics of an audio stream out of the sound card 304 may vary without deviating from the scope of the invention.

The PD 303 may comprise a LAN subsystem 306b, a display 310, and one or more speakers 312. The PD 303 may be enabled to receive multimedia data via the network cable 208 and be powered by a supply voltage and/or current received via the cable 208. In this regard, the PD 303 may be similar to or the same as the client 210 described with respect to FIG. 2B. The display 310 may be enabled to present video and/or graphics to a user. In various embodiments of the invention, data passed to the display 310 from the LAN subsystem 306b may be raw graphics and/or video or may be formatted according to one or more standards such as HDMI or DisplayPort. The speaker(s) 312 may be enabled to present audio to a user. In various embodiments of the invention, data passed to the speaker(s) 312 from the LAN subsystem 306b may be raw audio or may be formatted according to one or more standards such as Mp3 or AAC.

The LAN subsystems 306a and 306b may each comprise suitable logic, circuitry, and/or code that may enable transmitting and/or receiving multimedia data and associated auxiliary/control data over a network. The LAN subsystems 306a and 306b may each be enabled to format, encode, packetize, compress, decompress, or otherwise process multimedia data. The LAN subsystems 306a and 306b may each be enabled to utilize AVB. The LAN subsystems 306a and 306b may each utilize Ethernet protocols for transmitting and/or receiving data via the network cable 208. Additionally, the LAN subsystems 306a and 306b may each be enabled to format, encode, packetize, compress, decompress, or otherwise process multimedia data. In various exemplary embodiments of the invention, the LAN subsystems 306a and 306b may support Ethernet over copper and/or backplane Ethernet operations. The LAN subsystems 306a and 306b may support one or more data rates such as 10 Mbps, 100 Mbps, 1000 Mbps (or 1 Gbps), 2.5 Gbps, 4 Gbps, 10 Gbps, or 40 Gbps, for example. In this regard, the LAN subsystems 306a and 306b may support standard-based data rates and/or non-standard data rates. Additionally, the LAN subsystems 306a and 306b may enable communicatively coupling the network devices in a star, bus, mesh, tree, daisy chain, and/or ring topology.

The LAN subsystems 306a and 306b may, respectively, comprise power over Ethernet (POE) block 308a and 308b. The POE block 308a may comprise suitable logic, circuitry, and/or code for generating power to be supplied to the PD 303 via the cable 208 and for controlling an amount of power supplied to the PD 303 via the cable 208. In this regard, the POE block 308a may be enabled to manage a voltage and/or current supplied to the PD 303 in order to improve energy efficiency. Accordingly, the POE block 308a may receive one or more control signals from other components of the LAN subsystem 306a.

The POE block 308b may comprise suitable logic, circuitry, and/or code for receiving power via the cable 208. In this regard, the POE block 308b may be enabled to receive power via the cable 208 and distribute, regulate, or otherwise manage the received power. In this manner, at least a portion of the LAN subsystem 306b, the display 310, and/or the speaker(s) 312 may operate using power received via the cable 208. In some embodiments of the invention, the POE 308b may be enabled to indicate a power required from the PSE 301. For example, the POE 308b may comprise a variable sense resistor. In this regard, the POE block 308b may receive one or more control signals from other components of the LAN subsystem 306b. In other embodiments of the invention, the POE block 108a may utilize power classification techniques similar to or the same as those being developed by the IEEE 802.3at task force. In this regard, 2-Event classification and/or Layer 2 Classification may be supported by the POE blocks 108a and/or 108b.

In operation, the GPU 103 may generate video or graphics and may transfer the video or graphics to the LAN subsystem 306a for additional processing and/or formatting according to one or more networking standards. In one embodiment of the invention, the GPU may output raw video/graphics to the LAN subsystem 306a. In another embodiment of the invention, the GPU may output formatted video and/or graphics, DisplayPort or HDMI, for example, to the LAN subsystem 306a. The LAN subsystem 306a may encapsulate multimedia data into Ethernet frames and transmit the frames onto the cable 208. The LAN subsystem 306b may receive multimedia data over the network cable 208. The LAN subsystem 306b may de-packetize, parse, format, and/or otherwise process the received data and may convey received video data to the display 310 and may convey received audio data to the speaker(s) 312. In one embodiment of the invention, the LAN subsystem 306b may, for example, receive Ethernet frames and extract/reconstruct DP "micro-packets" from received Ethernet frames. The LAN subsystem 306b may convey the "micro-packets" to the display 310 and/or the speaker(s) 312. In another embodiment of the invention, the LAN subsystem 306b may extract the audio and/or video data from the micro-packets and convey raw multimedia data to the display 310 and/or the speaker(s) 312.

In some embodiments of the invention, the POE block 308a may be enabled to determine a power class of the PD 303. Accordingly, aspects of the invention may enable dynamically controlling how much power is supplied by the 308b to improve energy efficiency. For example, a lower power class may be selected when the PD 303 is processing and/or presenting only audio or low resolution video such as standard definition, whereas a higher power class may be selected when high definition video and/or audio is being processed and/or presented by the PD 303. In this manner, aspects of the invention may be suitable for use in and/or improve efficiency of energy efficient networks.

In operation, energy efficiency of communications between the LAN subsystems 306a and 306b may be improved through a variety of techniques. In this regard, since power consumption may be proportional to, or track, a data rate on the cable 208, an exemplary technique for improving energy efficiency may comprise controlling the inter-frame gap (IFG) time. In this regard, increasing the IFG may reduce the data rate while decreasing the IFG may increase the data rate. Similarly, the data rate on the cable 208 may be controlled by controlling a rate at which symbols are transmitted onto the cable 308. In this regard, one or more system and/or data clocks may be reduced in order to reduce the symbol rate.

With regard to the LAN subsystems 306 and 206b, for example, energy efficiency may be achieved by disabling, or putting into a low(er) power state, one or more channels of the cable 208 when those one or more channels are not required to meet demand of the link. In this manner, portions of the LAN subsystems 306a and 306b associated with the unused channels may be powered down.

Energy efficient operation may also be achieved by adjusting the size of a signal constellation utilized for representing data on the cable 208. In this regard, a signal constellation utilized to transmit signals may be reduced to provide lower data rates. For example, a subset of a larger signal constellation may be chosen such that encoding and decoding signals may be less hardware and/or processor intensive. In this manner, portions of the LAN subsystems 306a and 306b may consume less energy when encoding data utilizing a smaller or different signal constellation.

The pulse amplitude modulation (PAM) levels utilized for signaling may also be adjusted to provide energy efficient operation. For example, in 10 Gbps Ethernet, where data it typically encoded utilizing a PAM-16 scheme, aspects of the invention may enable switching to PAM-8 or PAM-4 for lower data rates. In this regard, utilizing fewer PAM levels, and thus smaller voltages, may reduce power consumption in the LAN subsystems 306a and 306b as well as energy consumed on the link 308.

Figure 4:
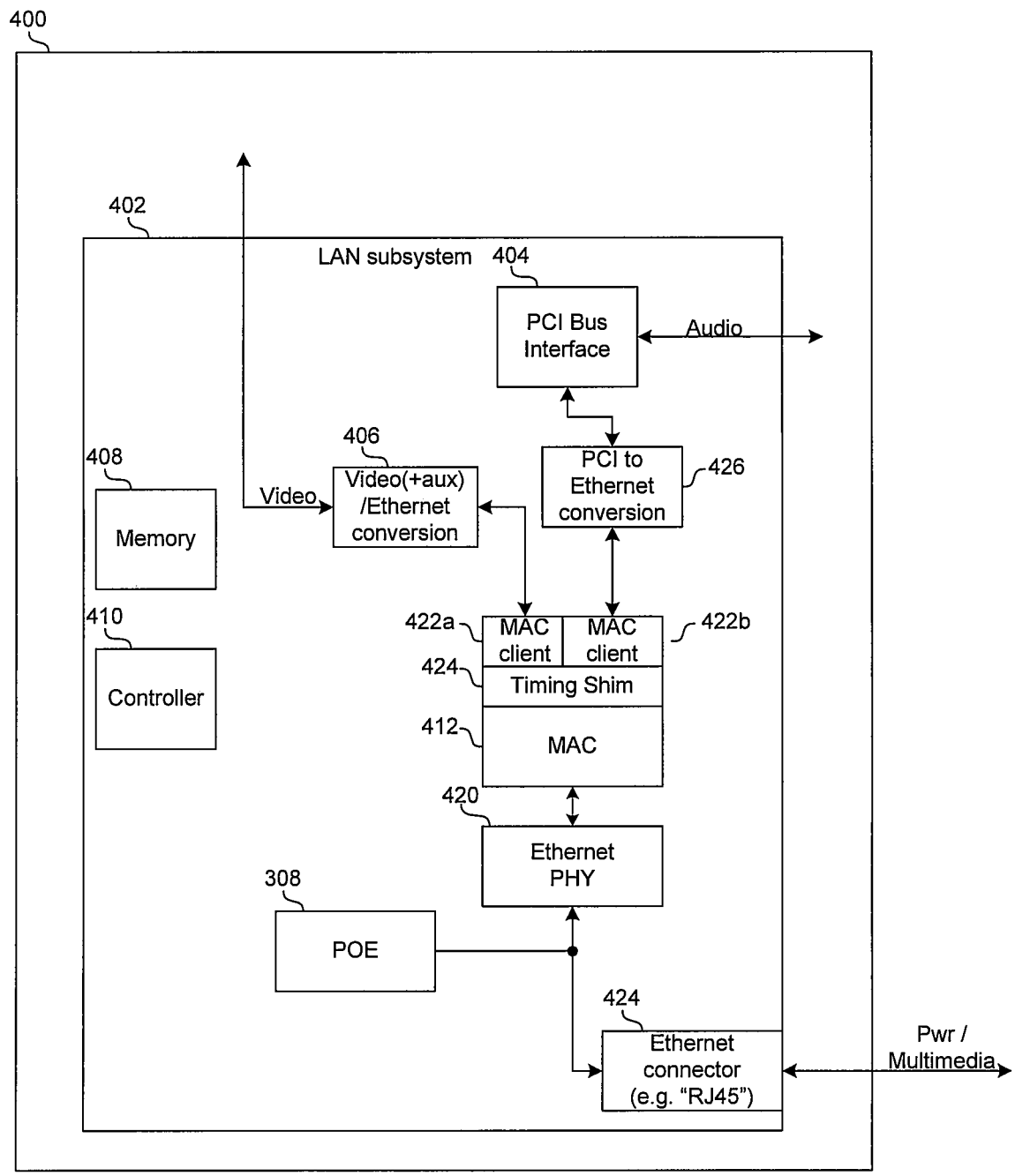
FIG. 4 is a block diagram illustrating an exemplary LAN subsystem, in accordance with an embodiment of the invention.

FIG. 4 is a block diagram illustrating an exemplary LAN subsystem, in accordance with an embodiment of the invention. Referring to FIG. 4, the system 400, which may be similar to or the same as the server 202, the node 206, and/or the client 210 described with respect to FIGS. 2A and 2B, may comprise a LAN subsystem 402. The LAN subsystem 402, which may be similar to or the same as the LAN subsystems 306a and 306b described with respect to FIG. 3, may comprise a PCI bus interface 404, a video and Ethernet conversion block 406, a PCI/Ethernet conversion block 426, MAC clients 422a and 422b, timing shim 424, a memory 408, a controller 410, a time stamp block 414, a MAC 412, an Ethernet PHY 420, and an Ethernet connector 424.

The PCI bus interface 404 may comprise suitable logic, circuitry, and/or code that may enable transmitting and/or receiving data via a PCI (Peripheral Component Interconnect) bus. In this regard, data from, for example, a southbridge, may be communicated to a network via the LAN system 402. For example, a PCI bus may provide a means for conveying audio data to and/or from an Ethernet connection. Although a PCI bus is used for illustration, any standardized or proprietary bus may be utilized for communication between the server 400 and the LAN subsystem 402 without deviating form the scope of various embodiments of the invention.

The video and Ethernet conversion block 406 may comprise suitable logic, circuitry, and/or code that may enable converting multimedia and associated auxiliary data to and from an Ethernet payload format. Video and associated auxiliary data received by the video and Ethernet conversion block 406 from a GPU, for example, may be packetized, depacketized, encapsulated, decapsulated, or otherwise processed so as to be formatted as one or more Ethernet payloads. Similarly, Ethernet payloads received from a MAC client, for example, may be packetized, depacketized, encapsulated, decapsulated, or otherwise processed so as to be formatted as one or more data or multimedia streams. For example, DisplayPort or HDMI formatted data may be extracted and/or reconstructed from one or more Ethernet payloads. Similarly, video and Ethernet conversion block 406 may receive packetized video data and/or audio data, such as a DisplayPort or HDMI stream, and may encapsulate and/or format the data into one or more Ethernet payloads. In some instances, audio may be synchronized to video and may be routed via the GPU. In these instances, both audio and video may be formatted into Ethernet payloads by the video and Ethernet conversion block 406. In various embodiments of the invention, the video and Ethernet conversion block 406 may receive control signals and/or data from the controller 410. Additionally, in various embodiments of the invention, the video and Ethernet conversion block 406 may store data to and/or read data from the memory 408. In various embodiments of the invention, the video and Ethernet conversion block 406 may be implemented in one or more physical and/or functional blocks. In this regard, various functions implemented by the video and Ethernet conversion block 406 may be shared and/or separated physically and/or functionally without deviating from the scope of the invention The PCI and Ethernet conversion block 426 may comprise suitable logic, circuitry, and/or code that may enable converting data received to and/or from an Ethernet payload format. In this regard, audio data, for example, received via a PCI bus may be formatted as one or more Ethernet payloads. Similarly, one or more Ethernet payloads may be formatted for transmission via a PCI bus.

In various exemplary embodiments of the invention, the video and Ethernet conversion block 406, the PCI and Ethernet conversion block 404, or other blocks comprising the LAN subsystem 400 may be enabled to perform compression and/or de-compression of video and/or audio content prior to and/or subsequent to packetization, depacketization, encapsulation, decapsulation.

The MAC clients 422a and 422b may each comprise suitable logic, circuitry, and/or code that may enable reception of Ethernet payloads from the video and Ethernet conversion block 406 and/or the PCI and Ethernet conversion block 426 and may enable encapsulating the Ethernet payloads in one or more Ethernet frames. Additionally, the MAC clients 422a and 422b may be enabled to receive Ethernet frames from the MAC 412 and may enable decapsulation of the Ethernet frames to extract Ethernet payloads which may comprise multimedia, auxiliary, control, or general Ethernet data. In this regard, Ethernet payloads may be formatted and/or encapsulated according to one or more protocols. For example Ethernet payloads may comprise DisplayPort micro-packets and/or IP datagrams. In this regard, other protocols may be utilized for the packetization and/or conveyance of data without deviating from the scope of the present invention. In an exemplary embodiment of the invention, multimedia data destined for a remote client may be first packetized into DP micro-packets. Subsequently, the DP micro-packets may be directly encapsulated into Ethernet frames. In another embodiment of the invention, the DP micro-packets may be encapsulated into one or more IP datagrams which may, in turn, be encapsulated into Ethernet Frames. Also, priority and quality of service properties of higher layer protocols may be mapped to physical layer via AVB. In various embodiments of the invention, the MAC clients 422a and 422b may receive control signals and/or data from the controller 410. Additionally, in various embodiments of the invention the MAC clients 422a and 422b may store data to and/or read data from the memory 408. In various embodiments of the invention, the MAC clients 422a and 422b may be implemented in one or more physical and/or functional blocks. In this regard, various functions implemented by the MAC clients 422a and 422b may be shared and/or separated physically and/or functionally without deviating from the scope of the invention.

The timing shim 424 may comprise suitable logic, circuitry and/or code that may enable reception of Ethernet frames from the MAC clients 422a and 422b. The timing shim 424 may append time synchronization information, such as a time stamp, to the Ethernet frames. The time stamp shim 424 may, for example, append a time stamp when the Ethertype field indicates that the Ethernet frame is to utilize AVB for transport across a network.

The memory 408 may comprise suitable logic, circuitry, and/or code that may enable storage of data. In this regard, the memory 408 may enable buffering received data. Additionally, the memory 408 may enable storage of state variable or other information utilized to control the operations of the LAN subsystem 402.

The controller 410 may comprise suitable logic, circuitry, and/or code that may enable operations of the LAN subsystem 402. In this regard, the controller 410 may be enabled to process data and/or provide control signals/information to enable and/or control operation of the various blocks comprising the LAN subsystem 402.

The MAC 412 may comprise suitable logic, circuitry, and or code that may enable providing addressing and/or access control to a network and may enable the transmission of the Ethernet frames via a network. In this regard, the MAC 412 may be enabled to buffer, prioritize, or otherwise coordinate the transmission and/or reception of data via the Ethernet connector 318 and associated physical link. The MAC 412 may be enabled to perform additional packetization, depacketization, encapsulation, and decapsulation of data. The MAC 412 may enable generation of header information within the Ethernet frames, which enable the utilization of AVB within a network for transport of the Ethernet frames. The MAC 412 may also enable traffic shaping of transmitted Ethernet frames by determining time instants at which Ethernet frames may be transmitted to a network. The MAC 412 may also enable generation of header information within the Ethernet frames, which utilize conventional Ethernet services. The conventional Ethernet services may not utilize traffic shaping and/or AVB, for example.

The Ethernet PHY 420 may comprise suitable logic, circuitry, and/or code that may enable transmission and/or reception of data bits over a physical medium. The Ethernet PHY 420 may be implemented in one or more physical and/or functional blocks. In this regard, various functions implemented by the Ethernet PHY 420 may be shared and/or separated physically and/or functionally without deviating from the scope of the invention. The Ethernet PHY 420 may be enabled to convert between digital values and analog symbols impressed on the physical medium. Accordingly, received symbols may be converted to digital values and assembled into Ethernet frames before being conveyed up to the MAC 412. Data received from the MAC 412 may be converted to physical symbols and transmitted onto a physical medium. In an exemplary embodiment of the invention, the physical medium may comprise twisted pair or coaxial cabling, and the transmitted symbols may be as defined by Ethernet protocols. In this regard, the Ethernet PHY 420 may enable Ethernet physical layer functionality.

The POE block 308 may be similar to, or the same as, the POE block 306a and/or the POE block 306b. In this regard, the system 400 may function as a PSE and/or a PD.

In an exemplary transmit operation, data conveyed to the MAC client 422a or 422b via, for example, the video and Ethernet conversion block 406 or the PCI and Ethernet conversion block 426, may be packetized into one or more Ethernet Frames. Subsequently, the frames may be conveyed to the MAC 412 which, in turn, may convey the frames Ethernet PHY 420 which may be convert the data to physical symbols and transmit the symbols onto a physical medium via the Ethernet connector 424. In this manner, multimedia and/or general data may be transmitted to a remote client over a network. Ethernet frames may comprise headers which identify a network path over which they are to be transmitted. In this regard, AVB may be utilized to ensure timely delivery of the frames. Additionally, headers comprising the Ethernet frames may comprise information which may be utilized to extract/reconstruct the multimedia and/or general data from the Ethernet datastream.

In an exemplary receive operation, symbols received via the Ethernet connector 318 may be converted to digital values and assembled into Ethernet frames before being conveyed up to another block, such as the video and Ethernet conversion block 406 or the PCI and Ethernet conversion block 426. In this manner, data received from a remote client via the Ethernet connector 318 may be extracted and/or reconstructed and the data may be provided to, for example, a GPU or audio processor of the system 400. Ethernet frames may comprise headers which identify a network path from which they are received. In this regard, AVB may be utilized to ensure timely delivery of the frames. Additionally, headers comprising the Ethernet frames may comprise information which may be utilized to extract and/or reconstruct multimedia and/or general data from the Ethernet datastream.

In addition to the transmission and reception of data via the Ethernet connector 424, the system 400 may also generate power for, or be supplied power from, a link partner communicatively coupled to the Ethernet connector 424. In instances that the system 400 is a PSE, the POE block 308 may determine a power class of a PD communicatively coupled to the Ethernet connector 424 by, for example, detecting a sense resistor in the PD. Accordingly, the power supplied to the connector 424 may be adjusted based on the power class detection. In this regard, the POE block may receive one or more control signals from, for example, the controller 410 and/or the memory 408. In instances that the system 400 is a PD, the POE block 308 may comprise a sense resistor communicatively coupled to the Ethernet connector 424, and the value of the sense resistor may be dynamically adjusted based on power levels required for operation of the system 400. In this regard, the sense resistor may be adjusted based on traffic being transmitted and/or received by the system 400. For example, for low(er) data rates a lower power class may be selected and for high(er) data rates a higher power class may be selected. Accordingly, the POE block 308 may receive one or more control signals from, for example, the MAC 412, the memory 408, and/or the controller 410.

Exemplary aspects of a method and system for utilizing a single connection for energy efficient delivery of power and multimedia information are provided. In this regard, power generated and/or received over a network link 208 may be controlled based on multimedia content communicated over the network link 208, wherein the multimedia content may be converted to and/or from Ethernet frames for communication over the network link 108 utilizing audio video bridging. The multimedia content may be formatted as raw audio and/or video or may be formatted according to HDMI, DisplayPort, or USB specifications, for example. The power may be controlled by selecting one of a plurality of power classes. The selection of power class may be based on resolution of the multimedia content, whether the multimedia comprises audio and/or video, and/or based on latency targets. Additionally and/or alternatively, the power class may be based on USB standards. A data rate on the network link 208 may be controlled via inter-frame gap adjustment, adjusting a signal constellation utilized for communication on the link, a symbol rate utilized on the link, and/or a number of PAM levels utilized on the link.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing a single connection for efficient delivery of power and multimedia information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for multimedia communications, the method comprising:
    in an Ethernet network device that concurrently supplies power and transmits multimedia content over a network link to a powered device, said multimedia content being audio content, video content, or audio and video content;
    identifying whether said multimedia content is audio content, video content, or audio and video content;
    selecting a power class of a plurality of power classes based on whether said identified multimedia content is audio content, video content, or audio and video content; and
    determining said supplied power based on said selected power class, said determination being independent of a power requirement of said powered device.

2. The method according to claim 1, comprising utilizing one or more Ethernet frames to encapsulate said multimedia content.

3. The method according to claim 1, comprising selecting said one of said plurality of power classes based on whether received multimedia content comprises high definition multimedia content.

4. The method according to claim 1, comprising selecting said one of said plurality of power classes based on a data rate required to meet latency targets of one or more Ethernet frames.

5. The method according to claim 1, comprising controlling an inter-frame gap between one or more Ethernet frames utilized for signaling on said network link based on a data rate required to meet latency targets for said one or more Ethernet frames.

6. The method according to claim 1, comprising delivering or receiving said supplied power in accordance with USB standards.

7. The method according to claim 1, comprising controlling a signal constellation based on latency targets for one or more Ethernet frames.

8. The method according to claim 1, comprising controlling a symbol rate on said network link utilized for signaling on said network link based on latency targets for one or more Ethernet frames.

9. The method according to claim 1, comprising controlling a number of pulse amplitude modulation (PAM) levels utilized for signaling on said network link based on latency targets for one or more Ethernet frames.

10. The method according to claim 1, selecting the power class based on a latency target.

11. A system for multimedia communication, the system comprising:
one or more circuits in an Ethernet network device operable to concurrently supply power and transmit multimedia content over a network link to a powered device, said one or more circuits being operable to:
select a power class of a plurality of power classes based on whether said multimedia content is audio content, video content, or audio and video content; and
determine said supplied power based on said selected power class, said determination being independent of a power requirement of said powered device.

12. The system according to claim 11, wherein said one or more circuits are operable to utilize one or more Ethernet frames to encapsulate said multimedia content.

13. The system according to claim 11, wherein said one or more circuits are operable to select said one of said plurality of power classes based on a resolution of received multimedia content.

14. The system according to claim 11, wherein said one or more circuits are operable to select said one of said plurality of power classes based on a data rate required to meet latency targets of one or more Ethernet frames.

15. The system according to claim 11, wherein said one or more circuits are operable to control an inter-frame gap between one or more Ethernet frames utilized for signaling on said network link based on a data rate required to meet latency targets for said one or more Ethernet frames.

16. The system according to claim 11, wherein said one or more circuits are operable to control a signal constellation utilized for representing data on said network link.

17. The system according to claim 11, wherein said one or more circuits are operable to control a symbol rate on said network link.

18. The system according to claim 11, wherein said one or more circuits are operable to control a number of pulse amplitude modulation (PAM) levels on said network link.

19. The system according to claim 11, wherein said one or more circuits are further operable to select the power class based on a latency target.

20. A method for multimedia communications, the method comprising:
in an Ethernet device that concurrently supplies power and transmits data over a network link to a powered device:
determining said supplied power to meet latency targets, based on a selected power class, said selection of said power class being based on whether multimedia content of one or more Ethernet frames is audio content, video content, or audio and video content, and said determination being independent of a negotiation between said Ethernet device and said powered device; and
controlling an inter-frame gap between said one or more Ethernet frames based on a data rate required to meet said latency targets for said one or more Ethernet frames.

* * * * *